United States Patent
Sevindik

(10) Patent No.: US 11,764,934 B2
(45) Date of Patent: Sep. 19, 2023

(54) FAST ADAPTIVE BUFFERING OF HIERARCHICAL TCP COMMUNICATIONS

(71) Applicant: CHARTER COMMUNICATIONS OPERATING, LLC, St. Louis, MO (US)

(72) Inventor: Volkan Sevindik, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 1 day.

(21) Appl. No.: 17/542,970

(22) Filed: Dec. 6, 2021

(65) Prior Publication Data

US 2023/0179375 A1 Jun. 8, 2023

(51) Int. Cl.
| | |
|---|---|
| H04L 5/00 | (2006.01) |
| H04L 29/08 | (2006.01) |
| H04W 28/02 | (2009.01) |
| H04W 28/08 | (2023.01) |

(52) U.S. Cl.
CPC ....... *H04L 5/0055* (2013.01); *H04W 28/0242* (2013.01); *H04W 28/0284* (2013.01); *H04W 28/0858* (2020.05)

(58) Field of Classification Search
CPC ......... H04W 28/0858; H04W 28/0242; H04W 28/0284; H04W 28/0231; H04W 28/0273; H04W 28/0289; H04W 28/0247; H04L 5/0055
See application file for complete search history.

(56) References Cited

U.S. PATENT DOCUMENTS

| | | | |
|---|---|---|---|
| 7,177,941 B2 | 2/2007 | Biran et al. | |
| 8,122,140 B2 | 2/2012 | Barreto et al. | |
| 8,228,815 B2 | 7/2012 | Keromytis et al. | |
| 9,100,236 B1* | 8/2015 | Shetty | H04L 67/562 |
| 10,299,181 B2* | 5/2019 | Lim | H04W 80/06 |
| 2007/0230479 A1 | 10/2007 | Liu | |
| 2008/0256271 A1 | 10/2008 | Breed | |
| 2015/0009999 A1* | 1/2015 | Oguchi | H04L 67/56 370/392 |
| 2021/0203728 A1* | 7/2021 | Branch | H04L 67/141 |

FOREIGN PATENT DOCUMENTS

EP           3160096 A1 * 4/2017 ......... H04L 41/0654

* cited by examiner

*Primary Examiner* — Rasheed Gidado
(74) *Attorney, Agent, or Firm* — Patent Beach PC

(57) ABSTRACT

Various embodiments comprise systems, methods, mechanisms, and apparatus providing a traffic management function suitable for use at an intermediate Transmission Control Protocol (TCP) node (e.g., a cable modem) through which TCP uplink (UL) and downlink (DL) session traffic flows via respective linked UL and DL buffers is configured to manage ACK/NACK message insertion into the DL buffer to provide accelerated TCP UL packet size increases to so as to rapidly increase TCP UL data flow through the intermediate network node, and to provide constrained TCP UL packet size so as to rapidly decrease TCP UL data flow (apply backpressure) so as to avoid a buffer overflow condition.

20 Claims, 3 Drawing Sheets

AT EACH GNB/ENB:

- CONNECT TO CABLE MODEM (CM)
- WAIT FOR ACTIVE CM-CMTS CONNECTION
- IF A CBSD GNB/ENB, THEN REGISTER WITH SAS & RECEIVE SPECTRUM GRANT FROM SAS
- INITIATE TCP SESSIONS WITH CMTS TO SUPPORT NETWORK SERVICES FOR CONNECTED UE AND IOT DEVICES, INCLUDING UPLINK TCP SESSIONS FOR IOT DEVICES
- BEGIN PROVIDING NETWORK SERVICES TO CONNECTED UE AND IOT DEVICES

210

AT CM:

- WHEN DISCOVERED BY CMTS, ESTABLISH ACTIVE CM-CMTS CONNECTION
- CREATE UL/DL BUFFERS FOR GNB/ENB-CMTS TCP SESSIONS

220

AT CM, FOR EACH TCP UL SESSION:

- RECEIVE TCP UL DATA PACKET FROM GNB/ENB AND PLACE IN UL DATA BUFFER

- IF TCP UL DATA PACKET SIZE GREATER THAN THRESHOLD, THEN PLACE NACK IN RESPECTIVE DL BUFFER (E.G., AT SAME BUFFER LOCATION IN REVERSE DIRECTION), AND OPTIONALLY TRANSMIT UL DATA PACKET FROM UL DATA BUFFER TOWARD CMTS

- IF UL DATA PACKET SIZE NOT GREATER THAN THRESHOLD, THEN TRANSMIT UL DATA PACKET FROM UL DATA BUFFER TOWARD CMTS, AND PLACE ACK IN RESPECTIVE DL BUFFER (E.G., AT SAME BUFFER LOCATION IN REVERSE DIRECTION)

- TRANSMIT ACK OR NACK FROM DL BUFFER TOWARD GNB/ENB

FAST ADAPTIVE BUFFERING OF HIERARCHICAL TCP COMMUNICATIONS

FIELD OF THE DISCLOSURE

The present disclosure relates generally to transmission control protocol (TCP) and, more particularly, to a method and apparatus for fast, adaptive buffering of TCP data within a hierarchical communications system.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Transmission Control Protocol (TCP) is a well known data transmission protocol used by many communications networks including wireless networks, such as to transmit data between a core network and a base station, eNodeB, gNodeB and the like in wireless communications with user equipment (UE) receiving network services therefrom. For example, many Mobile Web Services (MWS) use HTTP/TCP/IP (Hyper Text Transfer Protocol/Transmission Control Protocol/Internet Protocol) for communication between a web service client and a service provider, which includes the radio link.

In an attempt to control network congestion, TCP implements congestion avoidance and control algorithms. For example, at the onset of communication between a network proxy and a client, TCP implements a "slow-start" algorithm in which an initial data packet size is used for data transmission (e.g., from client to network proxy), wherein the transmission data packet size used for a next data packet is doubled in response to acknowledged successful reception (ACK) of a current packet, and halved in response to acknowledged unsuccessful reception (NACK) of the current packet (or a timeout). While this mechanism works reasonably well, it does not contemplate opportunities for improvement, or relevant limitations, associated with certain network topologies.

Given that a primary use case for communications networks/systems is client-side consumption of streaming media (e.g., broadcast television, streaming video, streaming audio, and the like), many such system have an architecture providing more downlink bandwidth than uplink bandwidth. While extremely efficient and favorable to downlink-heavy use cases, this performance tradeoff is not always ideal given the increasingly large (gigantic in fact) deployment of sensors and other Internet of Things (IoT) devices.

SUMMARY

Various deficiencies in the prior art are addressed by systems, methods, mechanisms, and apparatus by a traffic management function suitable for use at an intermediate Transmission Control Protocol (TCP) node (e.g., a cable modem) through which TCP uplink (UL) and downlink (DL) session traffic flows via respective linked UL and DL buffers is configured to manage ACK/NACK message insertion into the DL buffer to provide accelerated TCP UL packet size increases to so as to rapidly increase TCP UL data flow through the intermediate network node, and to provide constrained TCP UL packet size so as to rapidly decrease TCP UL data flow (apply backpressure) so as to avoid a buffer overflow condition.

The various embodiments are applicable to any intermediate communication node within a hierarchy of communication nodes configured to support TCP sessions between a hierarchically lower TCP node (lower than the intermediate communication node) to a hierarchically higher TCP node (higher than the intermediate communication node).

In one embodiment, a method is provided for adapting Transmission Control Protocol (TCP) uplink (UL) traffic flowing through a cable modem (CM) configured to support a TCP UL connections between one or more wireless communication nodes and a cable modem termination system (CMTS), the method comprising: establishing, for each TCP UL/DL session, respective linked UL and DL buffers configured to buffer both UL and DL TCP data for the TCP UL/DL session; receiving, for a TCP UL/DL session, a TCP UL data packet associated with the TCP UL/DL session; storing the received TCP UL data packet in an UL data buffer portion of the linked UL and DL buffers associated with the TCP UL/DL session; if the TCP UL data packet is larger than a threshold packet size, inserting a NACK into a DL data buffer of the linked UL and DL buffers associated with the TCP UL/DL session, and transmitting the data within the TCP DL data buffer toward the wireless communication node; if the TCP UL data packet is not larger than the threshold packet size, inserting a ACK into the DL data buffer of the linked UL and DL buffers associated with the TCP UL/DL session, transmitting the data within the TCP DL data buffer toward the wireless communication node, and transmitting the data within the TCP UL data buffer toward the CMTS.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 2 depicts a flow diagram of methods according to various embodiments;

Figure 1:
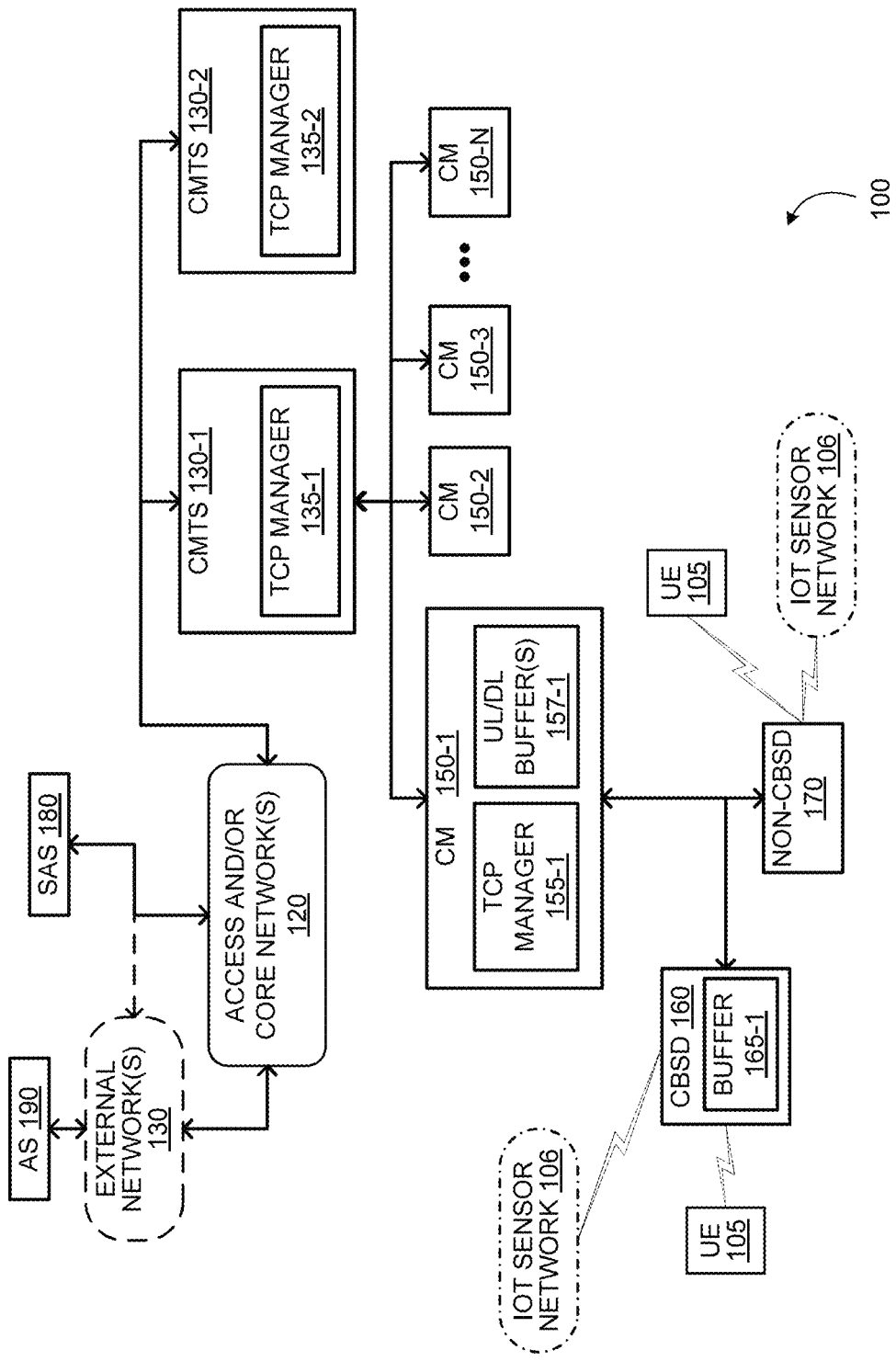
FIG. 1 depicts a high-level block diagram of a network services architecture benefiting from various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments contemplate methods and apparatus suitable for use in managing data flow in a communications system utilizing Transmission Control Protocol (TCP) connection management for both downlink (DL) and uplink (UL) paths. The embodiments find particular utility within the context of a communications system having an architecture favoring higher bandwidth DL paths that is now being used to support high bandwidth UL traffic.

In some embodiments, a hierarchically intermediate communication element (e.g., a cable modem or CM) supporting TCP connections between a hierarchically lower communication element (e.g., gNB/eNB) and a hierarchically higher communication element (e.g., a cable modem termination system or CMTS) uses a circular buffer for each TCP connection therebetween to temporarily store packets and ACKs/NACKs associated with the TCP session. To accommodate increased UL TCP packet size (e.g., such as from an increase in a number of sensors or other IoT devices reporting through gNB/eNB), the hierarchically intermediate communication element is configured to increase TCP UL throughput by transmitting received UL TCP packets to the hierarchically higher communication element and immediately insert an ACK message in the DL path, thereby indicating to the hierarchically lower communication element that a next and larger (e.g., doubled in size) UL TCP packet may be transmitted. The avoid a buffer overflow condition (e.g., such as from an UL TCP packet being too large to be accommodated by the circular buffer), the hierarchically intermediate communication element is configured to immediately insert a NACK message in the DL path if the TCP UL packet size exceeds a threshold packet size, thereby indicating to the hierarchically lower communication element that the TCP UL packet was not properly received and that the data of should be retransmitted in next and smaller (e.g., half the size or less) TCP UL data packets.

Thus, accelerated TCP packet size increases are used to increase TCP UL data flow, while TCP UL packet size is restrained to provide backpressure within the network so as to avoid a buffer overflow condition. Optionally, non-normative adjustments of TCP connection behavior may be used, such as ignoring ACK/NACK information that might otherwise cause a decrease in slow start (SS) data packet size, thereby forcing the use of significantly larger SS data packet sizes (e.g., 50%-100% of maximum SS data packet size for a TCP connection), increasing SS packet size in response to a received ACK message by an amount than a nominal TCP SS packet size increase, decreasing SS packet size in response to a received NACK message by an amount less than a nominal TCP SS packet size decrease, and/or causing other throughput-related modifications to TCP connection behavior or operating parameters.

Various embodiments provide a traffic management function at an intermediate TCP node (e.g., a cable modem) through which TCP uplink (UL) and downlink (DL) session traffic flows via respective linked UL and DL buffers is configured to manage ACK/NACK message insertion into the DL buffer to provide accelerated TCP UL packet size increases to to so as to rapidly increase TCP UL data flow through the intermediate network node, and to provide constrained TCP UL packet size so as to rapidly decrease TCP UL data flow (apply backpressure) so as to avoid a buffer overflow condition.

FIG. 1 depicts a high-level block diagram of a network services architecture benefiting from various embodiments Specifically, the exemplary network services architecture 100 of FIG. 1 is depicted as an architecture suitable for use by, for example, a network services provider such as a multiple-service operator (MSO) and the like, though other types of network services providers and network topologies also benefic from the disclosed embodiments.

As depicted in FIG. 1, a network services provider has deployed one or more access and/or core networks 120 as well as various provider equipment (PE) support the delivery of network services to user equipment (UE) 105 and Internet of Things (IoT) devices/network(s) 106 connected to the PE.

The PE may be used in support of UE 105 interacting with headend devices, servers, and the like within the access and/or core networks 120 (e.g., cable television head-end for delivering video streams to customers, a telecommunications hub/switch providing voice/data services to customers, and so on) or via external networks 130. For example, as depicted in FIG. 1 an application server 190 communicates via the access and/or core networks 120 either directly or through one or more external networks 130 such as the internet). External or internal application servers may support content distribution, a video conferencing, a remote voice or data connections, or any other type of application server function or media/information distribution function.

The PE may be used in support of Internet of Things (IoT) devices/network(s) 106 (e.g., utility company sensors, security sensors, lighting system controls, HVAC sensors/controls, and so on) reporting data via TCP UL paths to headend devices, servers, and the like within the access and/or core networks 120 or via external networks 130. For example, as depicted in FIG. 1 the application server 190 may be configured to receive the data from large numbers of IoT devices/network(s) 106 as part of any of the security monitoring, industrial monitoring, utility maintenance or consumption monitoring, or other IoT applications deployed or in the process of being deployed.

As depicted in FIG. 1, the PE associated with the network services provider comprises one or more cable modem termination systems (CMTSs) 130 (e.g., CMTSs 130-1 and 130-2), where each CMTS 130 is coupled via respective communication links to a respective plurality of cable modems (CMs) 150, illustratively CMs 150-1 through 150-N as shown with respect to CMTS 130-1. Communication between the PE networks 120, CMTSs 130, and CMs 150 may be provided using the Data Over Cable Service Interface Specification (DOCSIS). For purposes of this discussion it is assumed that the exemplary network services architecture 100 of FIG. 1 is configured to provide more downlink data bandwidth than uplink data bandwidth.

As depicted in FIG. 1, some or all of the CMs 150 may be further connected to communication nodes 160/170 suitable for providing wireless networking services to UE 105 and IoT devices/networks 106. The communication nodes 160/170 may comprise eNBs or gNBs communicating with UEs 105 using mobile network protocols such as 3G, 4G/LTE, 5G and the like. The communication nodes 160/170 may include buffers (e.g., such as buffer 165-1 depicted with respect to CBSD 160 of FIG. 1) configured to buffer data flows to UE 105 connected thereto so as to temporally smooth the delivery to UE of relevant data received via a high throughput channel/link from the CM.

The UE 105 may comprise any suitable type of device, such as cellular phones, smart phones, tablet devices and the like. The Internet of Things (IoT) devices/network(s) 106 may comprise machine-to-machine (M2M) communication devices, sensors, and so on.

The communication nodes 160/170 may comprise various types of communication nodes or resources using licensed spectrum, unlicensed spectrum such as citizens broadband radio service (CBRS) spectrum, or a combination of licensed and unlicensed spectrum. The communication nodes 160/170 may, in various embodiments, include midband (e.g., 3.5 GHz) gNBs, low-band (e.g., under 1 GHz) gNBs, or a combination of mid-band and low-band gNBs. In the case of communication nodes 160 having Citizens Broadband Radio Service Device (CBSD) capability, allocations of CBRS spectrum are provided via a Spectrum Access System (SAS) 180. Generally speaking, the SAS 180 communicates with a core network (e.g., a 5G core network) and is configured to control access to the CBRS frequency band for CBSD communication nodes 160 and related eNBs/gNBs provided thereby. Generally speaking, the SAS 180 is configured to ensure that the CBRS frequency band is allocated for CBSD use by, for example, CBSD 160, and that such use is adapted government requirements, network congestion, network interference and the like.

As depicted in FIG. 1, a CBSD eNB/gNB 160 is located at the end of a cable strand and connected to cable modem (CM) 150-1, which is in turn coupled to cable modem termination system CMTS 130-1, which is in turn coupled to a core network (e.g., a 5G core network) 120 for sending/receiving UE data, IoT data, and the like. CBSD eNB/gNB 160 may use a different number of antennas to create number of beams for each UE 105 and/or IoT devices/network(s) 106 in its wireless network/coverage area, and the number of beams created depends on the quality of service class, and the downlink throughput requirement. In strand based deployment model, a CBSD eNB/gNB is deployed on a cable strand (e.g., hybrid fiber-coax cable such as associated with a cable television network), and the CBSD eNB/gNB receives its data and power from a DOCSIS network comprising a cable modem (CM) and cable modem termination system (CMTS). There are typically many CMs connected to a single CMTS. The CMTS sends data to each CM in a time divided mode. Each CM receives its data using the assigned time slot, as assigned by a scheduler. The various embodiments provide a mechanism to send data based on the throughput requirements of CM such as constrained by buffering capability within the CM.

The various embodiments are applicable to any intermediate communication node within a hierarchy of communication nodes configured to support TCP sessions between a hierarchically lower TCP node (lower than the intermediate communication node) to a hierarchically higher TCP node (higher than the intermediate communication node). In the exemplary network 100 of FIG. 1, the intermediate node is primarily described with respect to the cable modems 150, which are hierarchically below/lower than the CMTSs 130, access network 120, and AS 190, and hierarchically above/higher than the communication nodes 160/170, UEs 105, and IoTs 106.

For each CMTS-CM-eNB/gNB link, respective uplink and downlink TCP sessions are established between the corresponding CMTS 130 and CM 150 and eNB/gNB. These TCP connections may operate in a normative manner with respect to the TCP protocols, such as the TCP slow start (SS) mechanism wherein TCP connection transmitters increase or decrease the size of subsequently transmitted data packets in accordance with ACK/NACK signals received from the relevant TCP receiver (or ACK/NACK timeout conditions).

The various embodiments adapt normative TCP protocol behavior to increase throughput while applying backpressure to avoid buffer overflow, as be described below with respect to FIG. 2. It is noted that the method 200 of FIG. 2 pertains to processing performed at a CM 150, CBSD communication node 160, non-CBSD communication node 170, and/or other elements within a system such as depicted herein with respect to FIG. 1. Various processing steps performed by these elements may be implemented by adapting buffers and buffer behaviors within the various elements (e.g., UL/DL buffers 157 within CM 150 and/or buffer 165 within a communication node 160/170), and enabled via monitoring/control functions within the elements themselves (e.g., TCP manager 155 within a CM 150 and/or a TCP manager 135 within a CMTS 130) or within standalone network management elements.

It is noted that various elements or portions thereof depicted in FIG. 1 and having functions described herein are implemented at least in part as computing devices having communications capabilities. These elements or portions thereof are implemented or instantiated via computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network services provider equipment comprising processing resources (e.g., one or more servers, processors and/or virtualized processing elements or compute resources) and non-transitory memory resources (e.g., one or more storage devices, memories and/or virtualized memory elements or storage resources), wherein the processing resources are configured to execute software instructions stored in the non-transitory memory resources to implement thereby the various buffers and methods and processes described herein. The network services provider equipment may also be used to provide some or all of the various other functions described herein.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

In various embodiments, the operation of the CM 150 and/or CMTS 130 with respect to the embodiments described herein are controlled via PE equipment such as head end servers, element management systems (EMSs), network management systems (NMS) and the like. In various embodiments, one or both of the CM 150 and/or CMTS 130 include an optional TCP manager; namely, TCP manager 155-1 and 135-1 as depicted in FIG. 1.

FIG. 2 depicts a flow diagram of methods according to various embodiments. Specifically, FIG. 2 depicts a TCP modification method for use at an intermediate TCP node between TCP endpoints, the method configured to adapt TCP protocol behavior to increase throughput while applying backpressure to avoid buffer overflow, as be described below with respect to FIG. 2.

The method 200 of FIG. 2 may be performed via the CMTS 130 (with or without a TCP manager 135), the CM 150 (with or without a TCP manager 155), or via a discrete management entity or server within the access network 120 or head end. Any of these managers or management entities may be implemented using processors or processing resources and non-transitory memory resources, wherein the processors or processing resources are configured to execute software instructions stored in the non-transitory memory resources to implement thereby the various methods and processes described herein. Any of these entities may further include communications resources configured to enable communications with CMTS 130, CM 150, CBSD gNB/eNB 160, non-CBSD gNB/eNB 170, and/or any logical or physical networking elements therebetween so as to receive QoS information including jitter information as described herein.

The method 200 of FIG. 2 will be described within the context of the CM 150 of FIG. 1, which is operative in various embodiments to buffer TCP data packets communicated between the CMTS 130 and any of the CBSD 160 or non-CBSD 170 eNB/gNB provider equipment.

To improve uplink speed (such as for use by sensors owned by utility companies configured to communicate via the network of an MSO), linked UL and DL buffers (e.g., a circular buffer) at the CM buffers both UL and DL data for CBSD-CMTS TCP sessions, where the CM proactively inserts ACKs in the DL data in response to corresponding received UL data, without waiting for the actual ACK from the CMTS. This has the effect of speeding up the TCP session convergence to a maximum data size. In the event of too much data for the circular buffer (also, e.g., received NACKs from the CMTS) the CM proactively inserts NACKs into the DL data (presumably also may also withhold ACKs) to, in effect, exert a backpressure control so as to avoid buffer overflow.

At step 210, at each gNB/eNB 160/170 being powered on or initialized, the following actions are taken: (1) the gNB/eNB 160/170 connects to the relevant cable modem (CM) 150; (2) the gNB/eNB 160/170 waits if necessary for the CM 150 to establish an active connection with the CMTS 130; (3) if CBSD gNB/eNB 160, then the CBSD gNB/eNB 160 registers with the SAS 180 and receives therefrom a spectrum grant; and (4) the gNB/eNB 160/170 begins providing network services to each UE 105 and IoT devices/network(s) 106 connected thereto via one or more beams supporting respective TCP uplink and TCP downlink connections.

At step 220, at the CM 150 (or a TCP manager), after establishing an active session with the CMTS 130, the CM 150 establishes for each TCP UL/DL session (session pair) respective linked UL and DL buffers (e.g., a circular buffer) configured to buffer both UL and DL data for the TCP UL/DL session. The buffer for each session may comprise a fixed amount of memory selected in accordance to a total available memory at the CM, a total number of TCP sessions processed by the CM, and so on. In various embodiments, increases/decreases in the number of TCP sessions may be used to trigger buffer load balancing and/or reconfigurations of buffer settings such as TCP packet sizes associated with ACK or NACK placements and so on, as will be discussed in more detail below.

A step 230, at the CM 150 (or a TCP manager), for each TCP UL session a TCP UL data packet transmitted by the respective gNB/eNB 160/170 is received by the CM 150 and stored in the UL portion of the linked UL and DL buffers associated with that session.

If the TCP UL data packet size is larger than a threshold packet size, a NACK is inserted into the DL portion of the linked UL and DL buffers associated with that session, for subsequent transmission to the respective gNB/eNB 160/170. The NACK will cause the next TCP UL data packet transmitted by the respective gNB/eNB 160/170 to be smaller than the currently received TCP UL data packet. This mechanism serves to exert backpressure on the respective gNB/eNB 160/170 so that the linked UL and DL buffers associated with the TCP session are not overflowed.

If the TCP UL data packet size is not larger than the threshold packet size, an ACK is inserted into the DL portion of the linked UL and DL buffers associated with that session, for subsequent transmission to the respective gNB/eNB 160/170. The ACK will cause the next TCP UL data packet transmitted by the respective gNB/eNB 160/170 to be larger than the currently received TCP UL data packet to increase throughput thereby. This mechanism further serves to increase throughput by informing the respective gNB/eNB 160/170 to immediately send the next TCP UL data packet (i.e., without waiting for an ACK from the CMTS 130).

Figure 3:
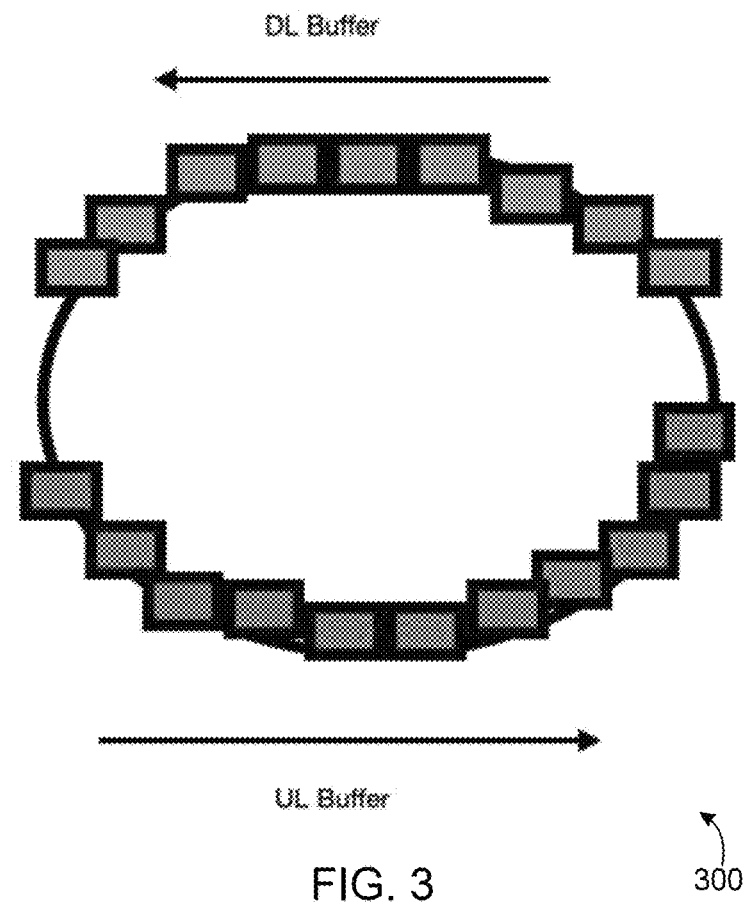
FIG. 3 graphically depicts a circular buffer configured according to various embodiments.
Figure 4:
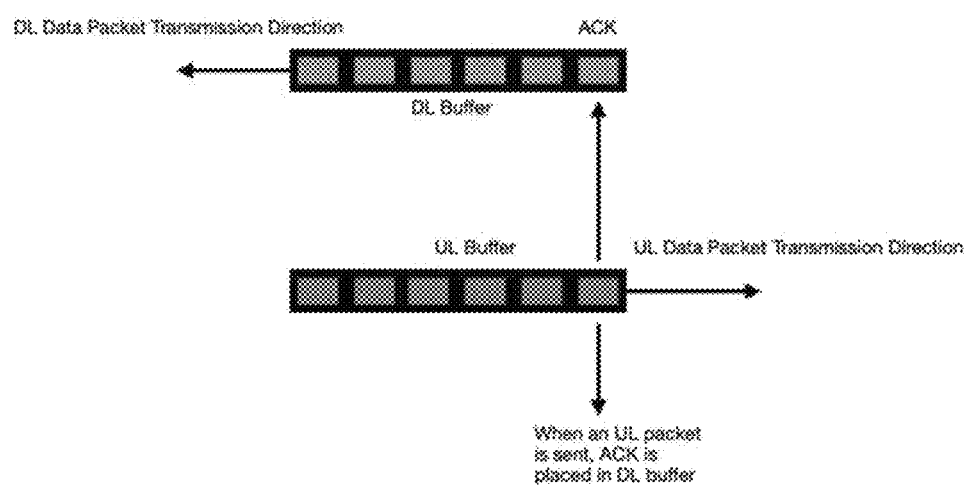
FIG. 4 graphically depicts operation of the circular buffer of FIG. 3 according to various embodiments.

FIG. 3 graphically depicts a circular buffer configured according to various embodiments. FIG. 4 graphically depicts operation of the circular buffer of FIG. 3 according to various embodiments. It is noted that packet sizes for use in the circular buffer may comprise a wide range of packet sizes, such as from 40 to 2000 bytes (other ranges are contemplated). The size of the circular buffer itself may be defined in terms of bytes. Buffer sizes can change from kilo bytes to megabytes. For example, if the buffer size is 1024 kilobytes, and one packet is 40 bytes, then the buffer can hold up to ~25600 packets. The various threshold levels as discussed herein may be defined in term of buffer fullness (or emptiness), utilization level and the like, such as a percentage of a maximum level (e.g., 50%, 65%, 80%, etc.). The DL and UL buffers may be processed independently, and packets may be transferred to additional DL or UL buffers if various embodiments.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof

What is claimed is:

1. A method for adapting Transmission Control Protocol (TCP) uplink (UL) traffic flowing through an intermediate TCP node from a hierarchically lower TCP node toward a hierarchically higher TCP node, the method comprising:
   establishing, for each TCP UL/DL (uplink/downlink) session, respective linked UL and DL buffers configured to buffer both UL and DL TCP data for the TCP UL/DL session;
   receiving, for a TCP UL/DL session, a TCP UL data packet associated with the TCP UL/DL session;
   storing the received TCP UL data packet in an UL data buffer portion of the linked UL and DL buffers associated with the TCP UL/DL session;
   if the TCP UL data packet is larger than a threshold packet size, inserting a NACK into a DL data buffer of the linked UL and DL buffers associated with the TCP UL/DL session, and transmitting the data within the TCP DL data buffer toward the hierarchically lower TCP node; and
   if the TCP UL data packet is not larger than the threshold packet size, inserting a ACK into the DL data buffer of the linked UL and DL buffers associated with the TCP UL/DL session, transmitting the data within the TCP DL data buffer toward the hierarchically lower TCP node, and transmitting the data within the TCP UL data buffer toward the hierarchically higher TCP node.

2. The method of claim 1, wherein the intermediate TCP node comprises a cable modem (CM) configured to support TCP UL connections between one or more wireless communication nodes and a cable modem termination system (CMTS).

3. The method of claim 1, wherein the method is performed by a wireless communication node configured to support TCP UL connections between user equipment (UE) and a cable modem (CM).

4. The method of claim 1, wherein the method is performed by a wireless communication node configured to support TCP UL connections between a network of Internet of Things (IoT) sensors and a cable modem (CM).

5. The method of claim 1, further comprising:
   if the TCP UL data packet is not larger than the threshold packet size, transmitting the data within the TCP UL data buffer toward the hierarchically higher TCP node.

6. The method of claim 1, wherein linked UL and DL buffers comprise a circular buffer.

7. The method of claim 2, further comprising at a CM being initialized, negotiating an active CM-CMTS connection with a CMTS as part of a discovery process, the active CM-CMTS connection configured to support TCP UL connections between the one or more wireless communication nodes and the CMTS.

8. The method of claim 2, wherein the one or more wireless communication nodes comprise gNB or eNB nodes.

9. The method of claim 2, wherein at least a portion of the one or more wireless communication nodes comprise Citizens Broadband Radio Service Device (CBSD) nodes.

10. The method of claim 9, wherein at least a portion of the TCP UL/DL sessions comprise Internet of Things (IoT) TCP sessions.

11. The method of claim 9, wherein at least a portion of the TCP UL/DL sessions comprise mobile communication device TCP sessions.

12. An apparatus configured to support Transmission Control Protocol (TCP) uplink (UL) traffic flowing therethrough from a hierarchically lower TCP node toward a hierarchically higher TCP node, the apparatus comprising:
   non-transitory memory resources configured to support, for each of a plurality of TCP UL/DL sessions, a linked uplink (UL) and downlink (DL) buffer, wherein each received TCP UL data packet associated with the TCP UL/DL session is stored in UL data buffer portion of the linked UL and DL buffers associated with the TCP UL/DL session; and
   a TCP manager, configured to control a TCP UL/DL session in response to respective TCP UL data packet size, wherein:
   if a TCP UL data packet is larger than a threshold packet size, inserting a NACK into a DL data buffer of the linked UL and DL buffers associated with the TCP UL/DL session, and transmitting the data within the TCP DL data buffer toward the hierarchically lower TCP node; and
   if the TCP UL data packet is not larger than the threshold packet size, inserting a ACK into the DL data buffer of the linked UL and DL buffers associated with the TCP UL/DL session, transmitting the data within the TCP DL data buffer toward the hierarchically lower TCP node, and transmitting the data within the TCP UL data buffer toward the hierarchically higher TCP node.

13. The apparatus of claim 12, wherein the apparatus comprises a cable modem (CM) configured to support TCP UL connections between one or more wireless communication nodes and a cable modem termination system (CMTS).

14. The apparatus of claim 12, wherein the apparatus comprises a wireless communication node configured to support TCP UL connections between user equipment (UE) and a cable modem (CM).

15. The apparatus of claim 12, wherein the apparatus comprises a wireless communication node configured to support TCP UL connections between a network of Internet of Things (IoT) sensors and a cable modem (CM).

16. The apparatus of claim 13, wherein: if the TCP UL data packet is not larger than the threshold packet size, transmitting the data within the TCP UL data buffer toward the CMTS.

17. The apparatus of claim 12, wherein linked UL and DL buffers comprise a circular buffer.

18. The apparatus of claim 13, wherein the apparatus is configured to negotiate an active CM-CMTS connection with a CMTS as part of a discovery process, the active CM-CMTS connection configured to support TCP UL connections between the one or more wireless communication nodes and the CMTS.

19. The apparatus of claim 13, wherein the one or more wireless communication nodes comprise gNB or eNB nodes, and wherein at least a portion of the one or more wireless communication nodes comprise Citizens Broadband Radio Service Device (CBSD) nodes.

20. A network architecture comprising:
a hierarchy of communication nodes, wherein each hierarchically intermediate communication node is configured to support Transmission Control Protocol (TCP) traffic therethrough from respective hierarchically lower communication nodes toward a hierarchically higher communication node;
wherein each hierarchically intermediate communication node comprises:
non-transitory memory resources configured to support, for each of a plurality of TCP UL/DL sessions, a linked uplink (UL) and downlink (DL) buffer, wherein each received TCP UL data packet associated with the TCP UL/DL session is stored in UL data buffer portion of the linked UL and DL buffers associated with the TCP UL/DL session; and
a TCP manager, configured to control a TCP UL/DL session in response to respective TCP UL data packet size, wherein:
if a TCP UL data packet is larger than a threshold packet size, inserting a NACK into a DL data buffer of the linked UL and DL buffers associated with the TCP UL/DL session, and transmitting the data within the TCP DL data buffer toward the hierarchically lower communication node; and
if the TCP UL data packet is not larger than the threshold packet size, inserting a ACK into the DL data buffer of the linked UL and DL buffers associated with the TCP UL/DL session, transmitting the data within the TCP DL data buffer toward the hierarchically lower communication node, and transmitting the data within the TCP UL data buffer toward the hierarchically higher communication node.

* * * * *